Nov. 11, 1930.     G. C. SLOCOMBE ET AL     1,781,413
DRILLING BIT
Filed July 30, 1929
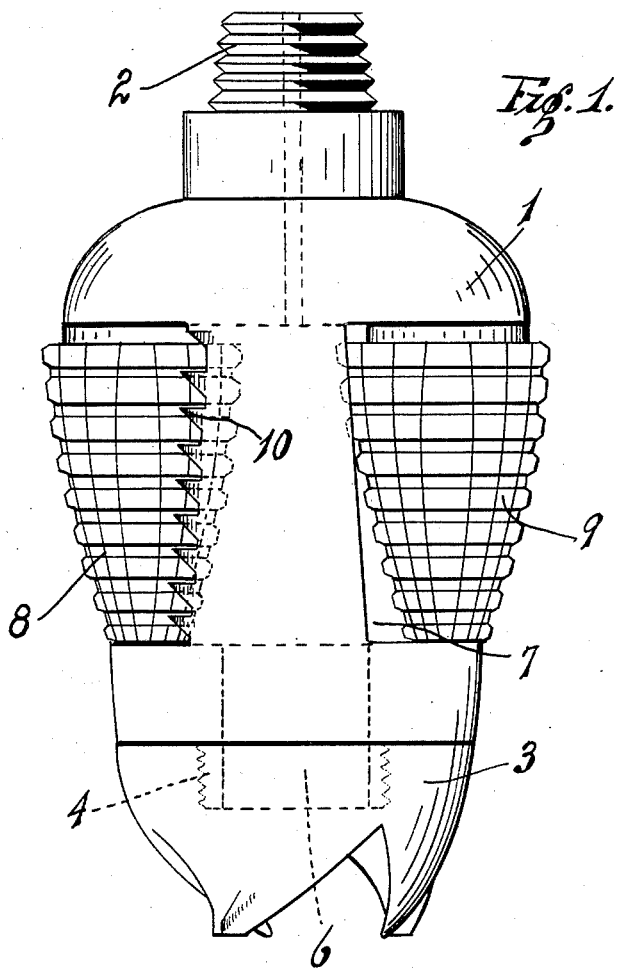
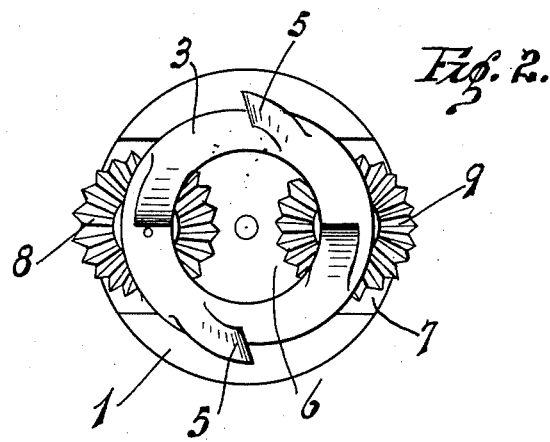
INVENTORS
GEORGE C. SLOCOMBE
ALFRED J. CORMIER.
BY
ATTORNEY Patented Nov. 11, 1930

1,781,413

UNITED STATES PATENT OFFICE

GEORGE C. SLOCOMBE, OF LONG BEACH, AND ALFRED J. CORMIER, OF BELLFLOWER, CALIFORNIA

DRILLING BIT

Application filed July 30, 1929. Serial No. 382,118.

This invention relates to a drilling bit, and particularly that type of bit which is used in the rotary drilling of wells.

An object of our invention is to provide a bit the lead cutter of which advances into the hole leaving a core, and upper reaming cutters act to break up this core.

Another object of invention is to provide a bit the reaming cutter of which serves to both ream the hole to the proper gage and also to break up the core.

Other objects, advantages and features of invention may appear from the accompanying drawing, the subjoined detailed description and the appended claims.

In the drawing:

Figure 1 is a side elevation of our bit.

Figure 2 is a bottom plan view of the same.

Referring more particularly to the drawing, the numeral 1 indicates the body of the bit on the upper end of which body we provide a threaded pin 2 whereby the bit is secured to the drill pipe. A lead cutter 3 is secured to the lower end of the body 1 in any suitable manner, for example, it may be screwed on to a depending threaded ring 4. The lead cutter 3 is in the nature of a ring, and is provided with a plurality of downwardly extending digging fingers 5. These fingers only cut on the outer priphery of the lead cutter.

The central portion remains as a core and passes upwardly thru the opening 6 into the body 1. The body 1 is provided with a transverse channel 7 and a pair of cone reaming cutters 8—9 are positioned in the channel 7, and one on either side of the bit. The cones 8—9 are so arranged that they will ream the hole and at the same time the inner edges of the cones will break up the core which has passed upwardly thru the opening 6 and into the channel 7. The reaming cutters 8—9 may be of any desired type although we have illustrated them in the present instance as cones. The body 1 is provided with a plurality of cleaning teeth 10 which project adjacent to the cones 8—9, thus keeping the teeth of the cones clear of débris.

Having described our invention we claim:

1. A drilling bit comprising a body, a lead cutter depending from said body, said lead cutter being adapted to cut a core, said body having a transverse opening therein, reaming cutters journaled in the body, said reaming cutters being adapted to engage and break up the core.

2. A drilling bit comprising a body, a lead cutter depending from said body, said lead cutter comprising a ring and a plurality of cutting fingers depending from the ring, said body having a transverse opening therethru, a pair of reaming cutters journaled in the body and positioned in said opening, said lead cutters being adapted to cut a core and said reaming cutters being adapted and arranged to engage and break up the core.

3. A drilling bit comprising a body, a ring, lead cutters screwed on to the body and depending therefrom, said body having a transverse opening therin and said body having a bore extending from the lead cutter to said opening, said lead cutter being adapted to cut a core, which core passes upwardly thru the bore into the opening and a pair of reaming cutters journaled in the body and positioned in said opening, said reaming cutters being adapted and arranged to engage and break up the core.

4. A drilling bit comprising a body, a lead cutter depending from said body, said lead cutter comprising a ring and a plurality of cutting fingers depending from the ring, said body having a transverse opening therethru, a pair of reaming cutters journaled in the body and positioned in said opening, said lead cutters being adapted to cut a core and said reaming cutters being adapted and arranged to engage and break up the core, and a plurality of cleaning fingers projecting from said body adjacent to the reaming cutters whereby the reaming cutters are kept clean of débris.

In testimony whereof, we hereby affix our signatures.

ALFRED J. CORMIER.
GEORGE C. SLOCOMBE.